United States Patent [19]
Ono et al.

[11] 4,198,601
[45] Apr. 15, 1980

[54] CONTROL UNIT FOR TRANSCEIVER

[75] Inventors: Atsushi Ono, Fussa; Shoji Fujino, Tokyo; Yukio Ozaki, Tateno; Kentaro Suzuki, Ageo, all of Japan

[73] Assignee: Nippon Atsudenki Kabushiki Kaisha t/a Japan Piezo Co. Ltd., Tokyo, Japan

[21] Appl. No.: 843,669

[22] Filed: Oct. 19, 1977

[51] Int. Cl.² .............................................. H01B 1/38
[52] U.S. Cl. ......................................... 455/73; 455/77
[58] Field of Search ............................ 325/15, 16, 25; 179/179

[56] References Cited
U.S. PATENT DOCUMENTS
4,032,844  6/1977  Imazeki ................................. 325/25

OTHER PUBLICATIONS
SBE, Touch/Com., Popular Electronics, Jun. 1976.

*Primary Examiner*—Robert L. Griffin
*Assistant Examiner*—Michael A. Masinick
*Attorney, Agent, or Firm*—Quaintance, Murphy & Richardson

[57] ABSTRACT

A control unit for the transceiver characterized in that the whole operating portions of the transceiver is built into a housing of such a size which makes it easy to grip by one hand and the operator can remote-control the transceiver, holding the housing separate from the transceiver in his hand.

16 Claims, 14 Drawing Figures

FIG. 7
FIG. 8
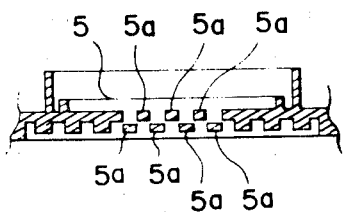
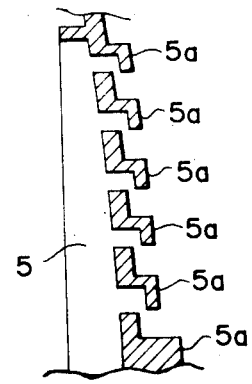
FIG. 6A
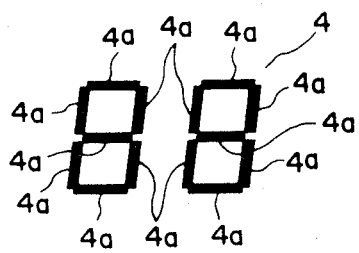
FIG. 6B
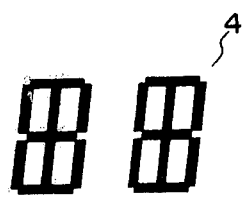
FIG. 6C
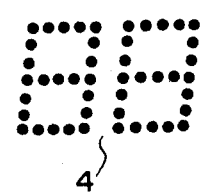
FIG. 11
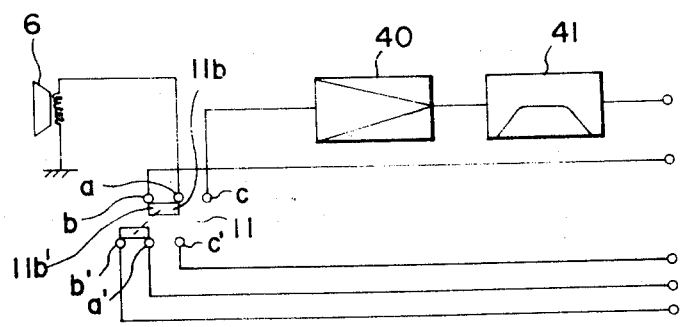

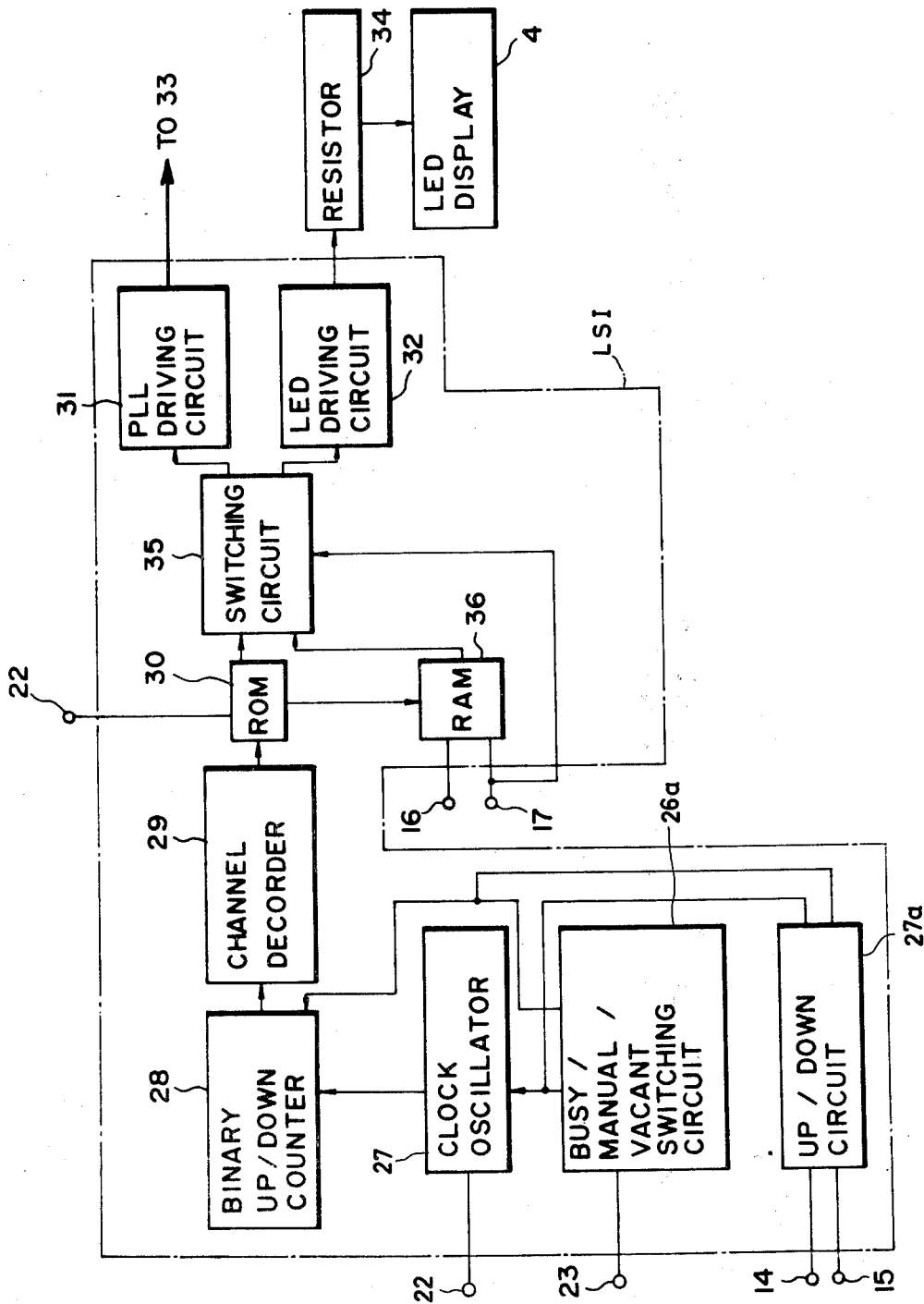

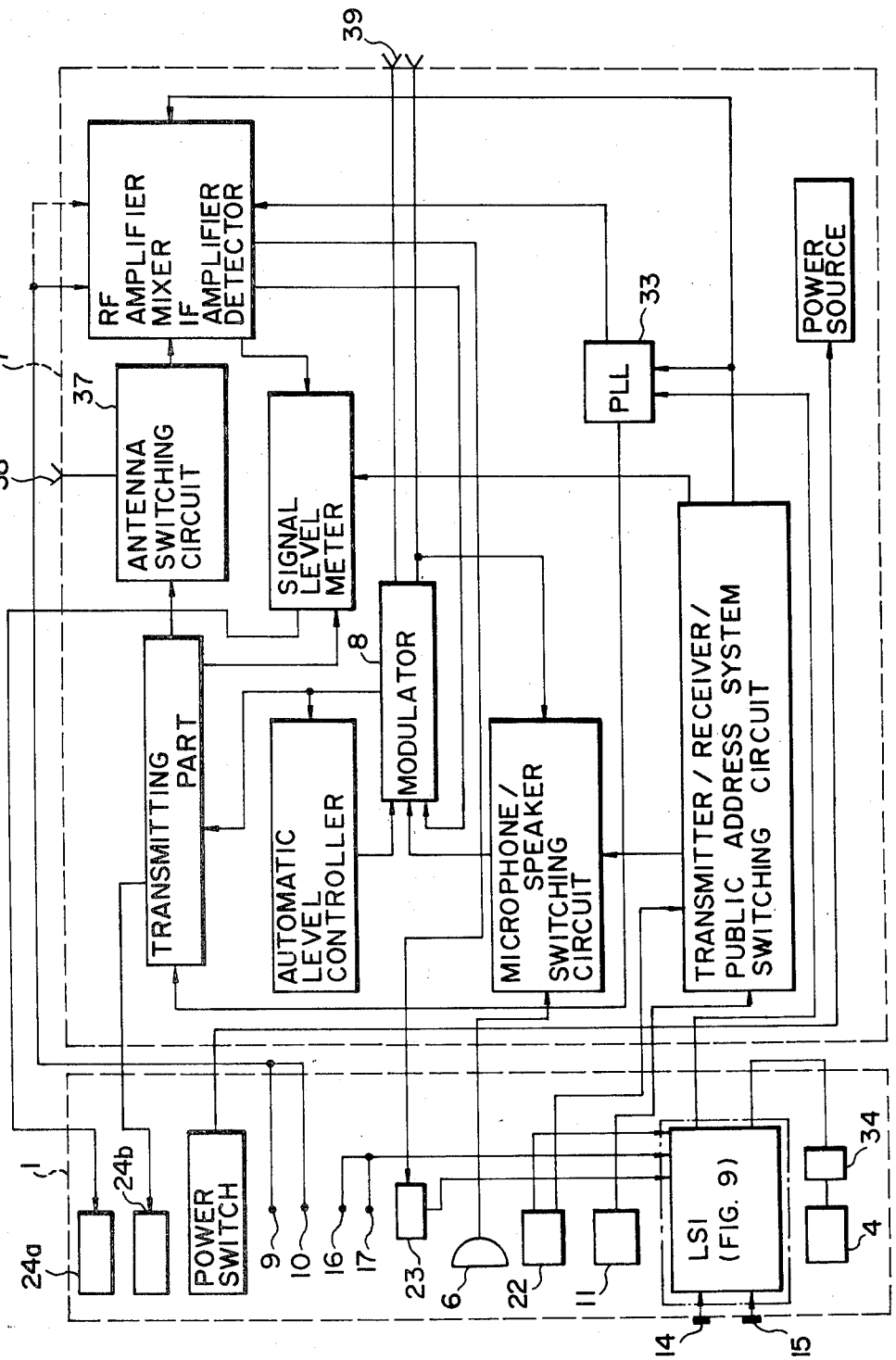

CONTROL UNIT FOR TRANSCEIVER

BACKGROUND OF THE INVENTION

The present invention relates to a control unit for the transceiver which permits the operator to handle the transceiver in his hand.

A citizen band transceiver which can be used as a fixed station and also can be mounted as a mobile station on a passenger car or on a truck is found very convenient and has been popularly used in various countries.

In the U.S.A. where the frequency bands assigned to the citizen band amount to as many as 40 channels, the transceiver has to be equipped with a 40-channel switch means. In the conventional practice the channels are switched with the aid of a large number of crystal resonators installed. If the crystal resonator switch means is to be separated from the transceiver and it is to be operated from the microphone side, the conductors in the cord connecting the microphone separated from the transceiver with the transceiver have to be increased, which is controversial from a standpoint of reliability.

The present invention, which aims at liquidation of the above difficulty, features the controllability of the transceiver by a digital coded signal.

SUMMARY OF THE INVENTION

The first object of the present invention is to provide a control unit for the transceiver in which the whole operating portions are separated from the transceiver and built into a housing small enough to be gripped easily by one hand so that the operator can operate the transceiver in his hand.

The second object of the present invention is to provide a control unit for the transceiver in which a digital coded signal for controlling the transceiver is generated in a unit separated from the transceiver and it is transmitted over a cord to the transceiver.

Another particular object of the present invention is to provide a transceiver which is controllable by a digital coded signal.

Several other objects of the present invention will become apparent from the following detailed account of embodiments of the present invention and attached drawings.

FIGS. 6 (A)(B)(C) show the elements of the channel number display device.

FIGS. 7 and 8 are section views of a blind structure of the control unit.

FIG. 9 is a block diagram of the electric circuit to be built into the housing.

FIG. 10 is a block diagram of the electric circuit in the transceiver.

FIG. 11 is a block diagram of the frequency characteristic compensation circuit.

Figure 2:
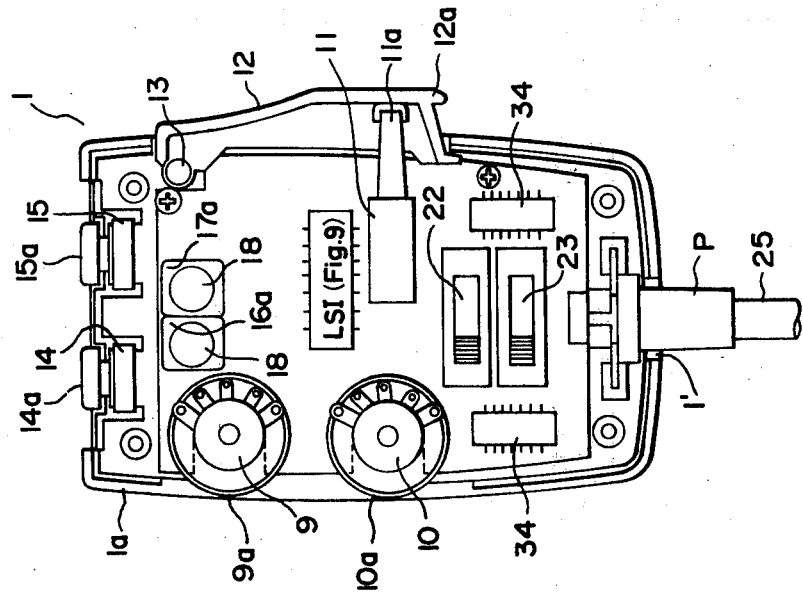
FIG. 2 shows the control unit of FIG. 1 with the rear casing removed therefrom.
Figure 1:
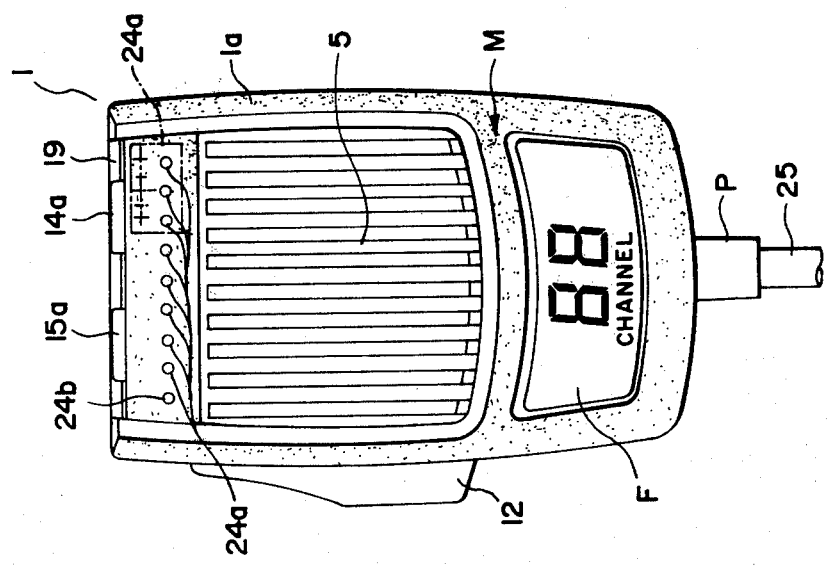
FIG. 1 is an elevation view of a control unit as one embodiment of the present invention.
Figure 3:
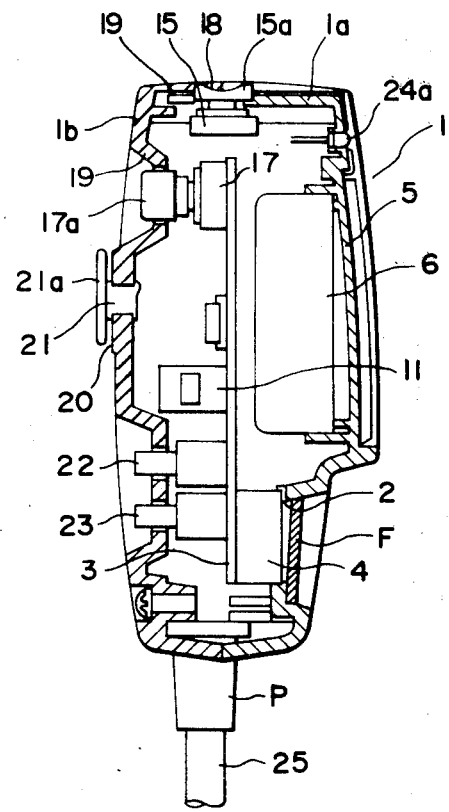
FIG. 3 is a left side section view of the control unit in FIG. 1.
Figure 12:
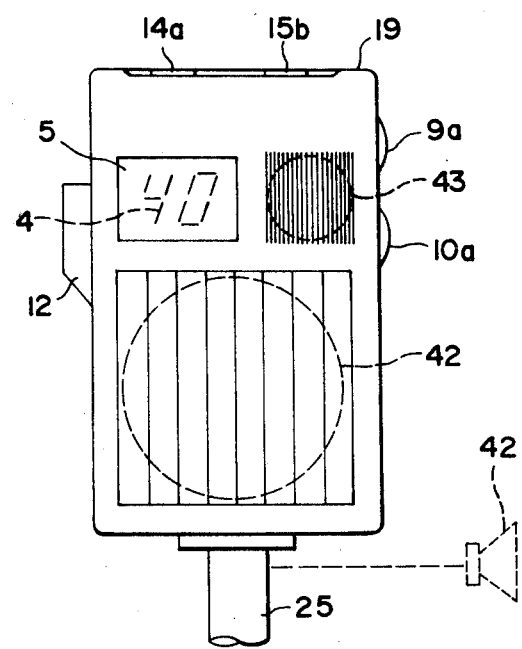
Figure 4:
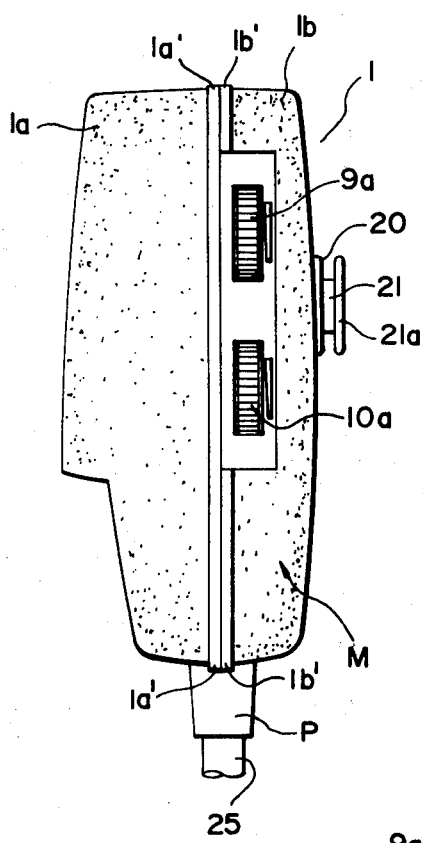
FIG. 4 is a right side section view of the control unit in FIG. 1.
Figure 5:
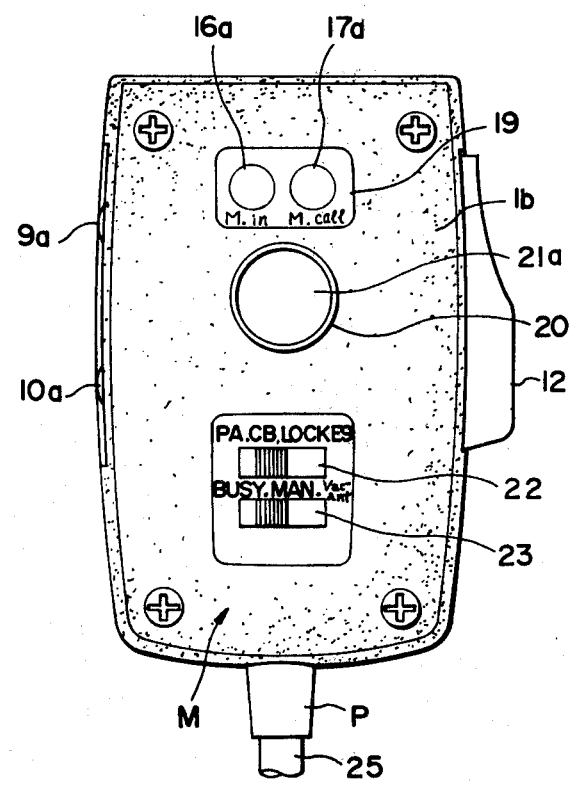
FIG. 5 is a backside view of the control unit in FIG. 1.

FIG. 12 shows a control unit as another embodiment of the present invention.

In FIGS. 1-5, the housing 1 is of such a size that it is easy to grip by one hand. Said housing 1 consists of the front casing 1a and the rear casing 1b, the whole surface of it being matt-finished (M) to prevent the reflection of light.

At the edges of the front casing 1a and the rear casing 1b there are provided flat-top ridges 1a', 1b', said ridges serving to bridge the front and rear casings to constitute the housing 1.

Before the front casing 1a is provided an opening 2, which faces the channel display device 4 composed of light emission diode (LED) and attached to the printed circuit board 3. Said opening 2 is equipped with an optical filter F which makes it easy to recognize the display on the display device 4.

As indicated in FIG. 6(A), the display device 4 is a 7-segment system, in which each segment 4a is selected to make a digital display of the channel to be used. In this case a 7-segment system is used but a 9-segment one illustrated in FIG. 6(B) or a 5-7 matrix one illustrated in FIG. 6(C) may be adopted to make a digital display in said display device 4. Further, instead of LED, liquid crystal or fluorescent-display tube may be employed as the display device 4.

As shown in FIG. 7, before the front casing 1a is provided a blind structure 5 in which bars 5a of rectangular sectional form are staggeredly arranged in the width direction at specific spacing to prevent dust or spittle in speaking from invading the housing 1. Within the front casing 1a there is provided an electroacoustic transducer 6 serving both as a speaker and as a microphone, said transducer 6 facing said blind structure 5. In a blind structure illustrated in FIG. 8, said bars 5 extend each in the horizontal direction of the housing 1, but these bars may be replaced with ones of crank sectional form which are arranged in vertical direction.

To the printed circuit board 3 of the front casing 1a there are attached a gain control element 9 (variable resistance) for varying the amplification degree of the audio amplifier and/or the radio frequency amplifier of the transceiver 7 and a squelch control element 10 (variable resistance) for controlling the squelch level of the transceiver 7. The knobs 9a, 10a of the elements 9, 10 are partly projecting laterally out of the housing 1 at the junction between the casings 1a, 1b. The gain control element 9 is equipped with an on-off switch (power switch) for power supply to the transceiver 7.

Within the front casing 1a there is installed a transmit/receive switch 11 which serves to switch between the transmitting ciucuit and the receiving circuit and to switch the transducer 6 between use as a speaker and use as a microphone, while a transmit/receive switch knob 12, swingably pivoted on the pin 13, juts out from the junction between the casings 1a and 1b in the opposite direction to the knobs 9a, 10a of the elements 9, 10. With the free end 12a of the knob 12 and the acting piece 11a of the switch 11 elastically brought into contact, the knob 12 is designed as a cantilever, thereby assuring the reliable action of the knob 12. The transmit/receive switch 11 is a timing switch which works such that in time of transmission the transducer 6 functions as a microphone after the transceiver is brought to the transmitting condition; and in time of reception the transceiver comes into the receiving condition after the transducer 6 ceases to function as a microphone.

Within the front casing 1a there are installed the up.down switches 14, 15 for selecting one of preset frequencies and the switches 16, 17 for writing in and reading out the channel number of a frequency to be used. The knobs 14a, 15a of the switches 14, 15 jut out from the top of the housing 1 and the knobs 16a, 17a of the switches 16, 17 come out through the rear casing 1b from the backside of the housing 1.

The knobs 14a, 15a, 16a, 17a have a recess 18 at the top to facilitate the working with a finger and a raised bank 19 around to prevent them from being worked by means other than the finger. The movable contact in the switches 14, 15, 16, 17 is designed as a dish, which generates a clicking sound when the contact is closed upon button-pressing, so that a reliable action can be assured.

A part of the backside in the rear casing 1b is raised to form a flat projection 20, on which a metal hook 21 with a head 21a is erected, thereby protecting the backside of the housing 1 when the housing is hung onto the transceiver by means of said hook 21 and at the same time facilitating the hanging of the housing.

The front casing 1a holds a changeover switch 22 for switching the transceiver to its function as a public address system or to its proper function as a transceiver and for calling up an emergency channel or locking the transceiver to a specific channel; and a changeover switch 23 for searching a vacant channel or a busy channel and for switching to manual operation. These switches 22,23, penetrating the rear casing 1b, come out of the housing 1.

Before the front casing 1a comes the transmit/receive level display element 24a consisting of LED to enhance the reliability of transmission and reception. In said element 24a, instead of LED, a moving coil type meter as illustrated by a one dot-chain line in FIG. 1 may be adopted.

The reliability of transmission is further enhanced by provision of an on-air display element 24b.

The electrical components in the housing 1 and in the transceiver 7 are electrically connected by a cord 25. At the hole 1' of the housing 1 is fitted a pipe P of soft material like rubber and the cord 25 runs through the pipe P, whereby the lead-out part of the cord 25 is protected.

FIG. 9 is a block diagram of the electric circuit for frequency selection and the electric circuit for digital display of the channel number corresponding to a selected frequency. These circuits, being LSI, are built into the housing 1. The circuit 26a is one for searching a vacant channel or a busy channel and for switching to manual operation and it is connected to a changeover switch 23. The circuit 26b is an up.down one to which the up.down switches 14, 15 are connected. The outputs from the circuits 26a,26b become the inputs to the clock oscillator 27 and the binary up.down counter 28. A changeover switch 22 to generate a locking signal is connected to the clock oscillator 27.

To the output side of the up.down counter 28 are connected the PLL (phase locked loop) drive circuit 31 and the LED drive circuit 32 over the channel decoder 29, the ROM circuit 30 and the switching circuit 35. The output from the PLL drive circuit 31 becomes the input to a programmable divider of the PLL frequency synthesizer 33 installed at the transceiver 7. On the other hand the output from the LED drive circuit 32 becomes the input to the channel number display device 4 through the resistance 34 as a voltage control means.

Meanwhile, the channel write-in, read-out RAM circuit 36 is connected with the PLL drive circuit 31 and the LED drive circuit 32 via the switching circuit 35. A switch 22 for calling up the emergency channel is connected to the ROM circuit 30, while write-in, read-out switches 16, 17 are connected to the RAM circuit 36.

The circuits 26a,26b; the oscillator 27; the counter 28; the channel decoder 29; ROM 30; RAM 36; the switching circuit 35; and the circuits 31,32 are LSI.

The electrical components built into the housing 1 are electrically connected utilizing both sides of a through-hole printed circuit board 3.

FIG. 10 is a diagram of the electric circuit. The transceiver 7 is brought to the transmitting condition when power is supplied by working the power switch of the gain control element 9. Under this condition the transmit/receive switch knob 11a is jutting out of the housing 1, while the transceiver has the receiving circuit ready for work and the transducer 6 ready to function as a speaker.

When the up (down) switch 14(15) is pressed for less than about one second, the channels change one by one; and when it is pressed continuously for more than one second, a scanning takes place automatically. When the up (down) switch 14(15) is pressed, a signal goes from the circuit 26b to the up.down counter 28, thereby switching to the up (down) mode. Meanwhile, depending on the duration of the switch 14(15) being pressed upon the signal from the circuit 26b, the clock oscillator 27 acts and the output therefrom goes to the up.down counter 28, then via the channel decoder 29 goes to the ROM circuit 30, where the digital coded data of frequency memorized in the ROM circuit is read out and sent to the PLL drive circuit 31 and the LED drive circuit 32. The output from the LED drive circuit 32 goes via the resistance 34 to the channel display device 4 and causes the channel number of the selected frequency to the digital-displayed. With the voltage controlled by the resistance 34, the display on the display device 4 is adjusted to an appropriate brightness. Meanwhile the output from the PLL drive circuit 31 goes to a programmable divider 33 of the PLL frequency synthesizer 33, whereby said synthesizer 33 functions as a local oscillator. Since the antenna switching circuit 37 has been switched to the receiving condition, the input radio wave from the antenna 38 is amplified by a radio frequency amplifier; and the output from this amplifier and a local oscillation output from the synthesizer 33 going into a mixer are connected to an intermediate frequency, which is amplified by the intermediate frequency amplifier and detected by a detector, thereby yielding an audio frequency. The yielded audio frequency is amplified by the audio amplifier 8 to actuate the transducer 6 functioning as a speaker in the housing 1. The modulator 8 functions as an audio amplifier in time of reception.

When the transmit/receive switch knob 12 is pushed into the housing 1, the contact in the switch 11 turns, causing the transducer 6 to function as a microphone and thereby bringing about the transmitting condition, under which the transmitting circuit in the transceiver 7 is ready to work.

Thereby the transmitting frequency is one selected by the up (down) switch 14(15) it is modulated by an audio signal from the transducer 6 and, after power-amplified by the transmitting part, it is transmitted from the antenna 38. The up switch 14 is used to scan the channels in an increasing direction of the channel number, while the down switch 15 is used to scan them in a decreasing direction of the channel number.

When the switch 22 is set at PA-mark position, the transducer 6 functions as a microphone and the audio signal from the transducer 6 is amplified by the modulator which functions also as an audio amplifier, thereby causing the speaker 39 for exclusive PA use to act so that the voice of the operator sitting in the vehicle can be heard aloud.

The transducer 6 which has to function both as a speaker and as a microphone has its microphone characteristic decreased and for this reason a frequency characteristic compensation circuit is provided.

Referring to FIG. 11, 6 is a transducer which serves both as a microphone and as a speaker; one terminal of it is earthed, while the other terminal of it is connected to a central contact a for switching the transducer 6 between use as a microphone and use as a speaker in the transmit/receive switch 11. The left end contact b is connected to the output side of the modulator 8, while the right end contact b is connected to the amplifying circuit 40 and the electrical filter 41. The output side of the filter 41 is connected to the input side of the modulator 8.

The other contacts a',b',c' of the switch 11 are so connected that switching can be made between the transmitting circuit and the receiving circuit. The sliding pieces 11b, 11b' are movable together with the acting piece 11a, which changes the contacts a,b,c, a',b',c'. The filter 41 used thereby can compensate the frequency characteristic of the transducer 6 functioning as a microphone and it passes only a band with high articulation.

When the switch 22 is set at E9-mark position, the emergency channel is read out from the ROM circuit and the channel to be used becomes the emergency one. When the switch 22 is set at LOCK position, the clock oscillator 27 ceases to oscillate and the channel being used is locked. When the power is supplied, the channel selection begins with the channel No. 1. Upon pressing of the switch 16, the channel to be used is written into the RAM circuit 36; and even if another channel is in use, a pressing of the switch 17 will cause the written-in channel to be read out from the RAM circuit 36 and transmission/reception will be made through this channel.

When the switch 14(15) is pressed using the squelch signal from the transceiver 7 and with the switch 22 set at BUSY position, a used channel is selected by scanning and at VACANT position a vacant channel is selected by scanning.

FIG. 12 illustrates another embodiment of the present invention, in which the speaker and the microphone are provided as separate units. In this embodiment, 1 is the housing, which holds the microphone unit 42 and the speaker 43 in relative positions as described later. The cord 25 comes out from under the housing 1 and it is connected to the transceiver 7.

The speaker extends from nearly the midpoint to one end (bottom in the drawing), of the housing 1, while the microphone unit extends from nearly the midpoint, which is adjacent to the speaker, to the other end (top in the drawing), of the housing 1, slightly shifting to the right of the center of the housing 1.

Installation of the microphone unit 42 in such a position leaves a gap within the housing 1 and this gap is filled with the channel number display device 4.

Installation of the microphone unit in such a position permits a large number of necessary functional components to be built into the casing, thereby improving the workability of the device. In this case, the frequency characteristic compensation circuit is not generally provided.

If necessary, only the microphone unit 42 may be built into the housing 1 and the speaker 43, separated from the housing 1, may be placed in the transceiver 7 or at appropriate position on the vehicle. In this case, the speaker 43 may be one for radio use.

Thus according to the present invention, the transceiver operating unit is wholly housed in a control unit separated from the transceiver and therefore the operator can freely handle the transceiver with the control unit in his hand. Since a digital coded signal is employed to select the frequency and the electric circuit is LSI, the action is reliable with an increased dependability.

Moreover the control unit can be made so compact as to permit one-hand operation. Further, a few conductors suffice in the cord connecting the control unit with the transceiver. Furthermore, as the whole operating unit of the transceiver is housed in the control unit, there is no restriction on the fitting position of the transceiver.

What is claimed is:

1. A control unit for a transceiver comprising:
   (a) a housing sized to be conveniently held in one hand,
   (b) a transmit/receive switch, a gain control, and a squelch control, each mounted within the housing and operable therefrom, each being electrically connected over a multi-conductor cord to said transceiver for remote control of the transceiver,
   (c) an electroacoustic transducer, mounted within the housing and electrically connected to the transceiver through the multi-connector cord,
   (d) a frequency selecting means mounted within the housing for selecting any one of a number of preset operating frequencies, the frequency selecting means comprising:
      (1) a programmable random access memory (RAM) for storing codes indicative of each of the preset operating frequencies,
      (2) a read only memory (ROM) having a first output connected to the RAM for controlling access to the stored codes,
      (3) a switching circuit connected to the RAM and the ROM for switching the selected stored code to a phase-looped locked (PLL) driving circuit connected to the transceiver through said multi-connector cord,
      (4) a binary up/down counter connected to an input of the ROM for indexing the ROM through the operating frequencies,
      (5) an up/down circuit, connected to one input of the binary up/down counter and operated by the manually actuated up/down switches for manually selecting the desired preselected operating frequency, and
      (6) a vacant channel selecting circuit and clock oscillator connected to another input of the binary up/down counter for automatically scanning and selecting a vacant operating frequency on which the transceiver might operate, and
   (e) a channel number display means situated with its display surfaces exposed out of said housing and connected to the switching circuit of the frequency selecting means for displaying the channel number of the selected operating frequency.

2. Control unit of claim 1 wherein the channel number display means is selected from the group consisting of a liquid crystal display and a fluorescent-display tube.

3. Control unit of claim 1, wherein the electroacoustic transducer means functions both as a speaker and as a microphone.

4. Control unit of claim 1 wherein the transmit/receive switch means comprises a switch each contact of which is staggered with respect a mating contact such that the electroacoustic transducer means functions as a microphone after the transceiver is brought to transmitting condition and the transceiver returns to receiving condition after the electroacoustic transducer means ceases to function as a microphone.

5. Control unit of claim 1, wherein an amplifier and an electrical filter are connected to the output side of the electroacoustic transducer means which is employed as a microphone.

6. Control unit of claim 1, wherein the electroacoustic transducer means consists of a speaker and a microphone as separate units.

7. Control unit of claim 1, wherein the housing is equipped with a switch means for writing in and reading out a channel to be used.

8. Control unit of claim 1, wherein the housing is equipped with a switch means which switches the transceiver between its use as a public address system and its proper use as a transceiver.

9. Control unit of claim 1 wherein the channel selecting means further comprises a switch means to lock onto a channel to be used by stopping the oscillation of said clock oscillator.

10. Control unit of claim 1, wherein the electroacoustic transducer means consists of a microphone and a speaker as separate units, the microphone being held in the housing and the speaker being set separate from the housing.

11. Control unit of claim 1 wherein the frequency selecting means further comprises a LED drive circuit connected between said switching circuit and said channel number display means and wherein the channel number display means is an LED display.

12. Control unit of claim 11, wherein the display surface of the channel number display means is provided with an optical filter which facilitates the recognition of the display.

13. Control unit of claim 1, wherein the housing is equipped with a transmit/receive level display means to confirm the transmit/receive condition of the transceiver.

14. Control unit of claim 13, wherein the transmit/receive level display means consists of LED.

15. Control unit of claim 13, wherein the transmit/receive level display means consists of a moving coil type meter.

16. A transceiver and a control unit connected to the transceiver by a multi-conductor card for remote control of the transceiver comprising:
(a) a control unit housing sized to be conveniently held in one hand,
(b) a transmit/receive switch, a gain control, and a squelch control, each mounted within the control unit housing and operable therefrom, each being electrically connected to the transceiver through the multi-conductor cord,
(c) an electroacoustic transducer, mounted within the control unit housing and electrically connected to the transceiver through the multi-conductor cord,
(d) a frequency selecting means mounted within the control unit housing for selecting any one of a number of preset operating frequencies, the frequency selecting means comprising:
 (1) a programmable random access memory (RAM) for storing codes indicative of each of the preset operating frequencies,
 (2) a read only memory (ROM) having a first output connected to the RAM for controlling access to the stored codes,
 (3) a switching circuit connected to the RAM and the ROM for switching the selected stored code to a phase-loop locked (PLL) driving circuit connected to the transceiver through said multi-conductor cord,
 (4) a binary up/down counter connected to an input of the ROM for indexing the ROM through the operating frequencies,
 (5) an up/down circuit, connected to one input of the binary up/down counter and operated by manually actuated up/down switches for manually selecting the desired preselected operating frequency, and
 (6) a vacant channel selecting circuit and clock oscillator connected to another input of the binary up/down counter for automatically scanning and selecting a vacant operating frequency on which the transceiver might operate,
(e) a channel number display means situated with its display surfaces exposed out of said control unit housing and connected to the switching circuit of the frequency selecting means for displaying the channel number of the selected operating frequency,
(f) a transceiver housing,
(g) a PLL frequency synthesizer in the transceiver housing and connected to the PLL driving circuit of said frequency selecting means for synthesizing a local oscillation controlling the transmitting and receiving frequencies,
(h) a receiving circuit in the transceiver housing connected through the multi-conductor cord to the transmit/receive switch, gain control and squelch control, the receiving circuit comprising:
 (1) a radio frequency amplifier (R.F.Amp.) for amplifying any input radio wave signal from an antenna,
 (2) a mixer connected to the R.F.Amp. and the PLL frequency synthesizer for converting the output from the R.F.Amp. into an intermediate frequency (I.F.) signal in accordance with the local oscillation output from the PLL frequency synthesizer,
 (3) an IF amplifier connected to the mixer for amplifying the IF signal output from the mixer,
 (4) a detector connected to the I.F. amplifier for detecting any audio frequency output from the IF amplifier, and
 (5) a modulator serving as an audio amplifier, connected to the detector and through the multi-conductor cord to the electroacoustic transducer, for amplifying the audio frequency output from the detector, the amplified audio frequency signal being applied to the electroacoustic transducer, the receiving circuit becoming operative by the operation of the transmit/receive switch, and (i) a transmitting circuit in the transceiver housing connected through the multi-conductor cord to the transmit/receive switch, the transmitting circuit comprising:
(1) said modulator generating an output at the frequency selected by the frequency selecting means modified by an audio signal component from said electroacoustic transducer, and
(2) a transmitting part for amplifying and transmitting from an antenna the output from the transmitting circuit, the transmitting circuit becoming operative by the operation of the transmit/receive switch.

* * * * *